(12) United States Patent
Prabhu et al.

(10) Patent No.: US 9,201,851 B2
(45) Date of Patent: Dec. 1, 2015

(54) METHODS AND APPARATUS FOR IN-LINE EDITING OF WEB PAGE CONTENT STORED IN MULTIPLE DATA STORES

(71) Applicant: Volusion, Inc., Austin, TX (US)

(72) Inventors: Sheetal Prabhu, Austin, TX (US); Tim Schmidt, Austin, TX (US); Dimitri Lundquist, Austin, TX (US)

(73) Assignee: Volusion, Inc., Austin, TX (US)

( * ) Notice: Subject to any disclaimer, the term of this patent is extended or adjusted under 35 U.S.C. 154(b) by 0 days.

(21) Appl. No.: 13/708,408

(22) Filed: Dec. 7, 2012

(65) Prior Publication Data

US 2014/0047321 A1 Feb. 13, 2014

Related U.S. Application Data

(63) Continuation of application No. 13/584,090, filed on Aug. 13, 2012, now Pat. No. 8,370,219.

(51) Int. Cl.
*G06F 17/00* (2006.01)
*G06F 17/22* (2006.01)
*G06F 17/21* (2006.01)
*G06Q 30/06* (2012.01)

(52) U.S. Cl.
CPC .......... *G06F 17/2247* (2013.01); *G06F 17/211* (2013.01); *G06Q 30/0641* (2013.01)

(58) Field of Classification Search
CPC ............ G06F 17/212; G06F 17/30899; G06F 17/30994
USPC .......... 715/200, 201, 202, 203, 234, 273, 274
See application file for complete search history.

(56) References Cited

U.S. PATENT DOCUMENTS

| | | | | |
|---|---|---|---|---|
| 2002/0161733 A1* | 10/2002 | Grainger | | 706/45 |
| 2003/0163519 A1* | 8/2003 | Kegel et al. | | 709/203 |
| 2006/0129926 A1* | 6/2006 | Malek et al. | | 715/530 |
| 2007/0078725 A1* | 4/2007 | Koszewski et al. | | 705/26 |
| 2008/0275980 A1* | 11/2008 | Hansen | | 709/224 |
| 2009/0307123 A1* | 12/2009 | Gershon | | 705/37 |
| 2010/0107062 A1* | 4/2010 | Bacus et al. | | 715/269 |
| 2010/0205579 A1* | 8/2010 | Zhao et al. | | 717/105 |
| 2010/0251143 A1* | 9/2010 | Thomas et al. | | 715/760 |
| 2012/0084403 A1* | 4/2012 | Calvin et al. | | 709/219 |
| 2012/0130853 A1* | 5/2012 | Petri et al. | | 705/26.35 |
| 2012/0144364 A1* | 6/2012 | Lau et al. | | 717/103 |
| 2012/0290959 A1* | 11/2012 | Quine | | 715/765 |
| 2012/0291006 A1* | 11/2012 | Quine | | 717/105 |

* cited by examiner

*Primary Examiner* — Stephen Hong
*Assistant Examiner* — Gregory J Vaughn
(74) *Attorney, Agent, or Firm* — Stephen A. Mason; Meyertons, Hood, Kivlin, Kowert & Goetzel, P.C.

(57) ABSTRACT

Methods and apparatus for in-line editing of web page content stored in multiple data stores are described. In one embodiment, a rendering of a web page is presented in a what-you-see-is-what-you-get (WYSIWYG) editing environment. The presenting includes combining business transaction data from an inventory and accounting data store and web page presentation data from a page content data store. The presenting further includes rendering in the what-you-see-is-what-you-get environment the web page as viewable in a browser. Responsive to receiving an edit of an element of editable content from the what-you-see-is-what-you-get editing environment, the element of editable content of the electronic commerce web page is updated in both the inventory and accounting data store and the rendering.

20 Claims, 14 Drawing Sheets

METHODS AND APPARATUS FOR IN-LINE EDITING OF WEB PAGE CONTENT STORED IN MULTIPLE DATA STORES

This application is a continuation of U.S. patent application Ser. No. 13/584,090, filed Aug. 13, 2012, which is incorporated by reference herein in its entirety.

BACKGROUND

Description of the Related Art

As the reach and accessibility of computer networks such as the Internet increase, the amount of information accessible via such networks has grown exponentially. For example, as commercial enterprises increasingly embrace electronic commerce techniques, numerous websites offering information and purchasing opportunities for various products and services have appeared. Major media outlets commonly provide web-based versions of content previously available only through print or broadcast channels, and in some instances generate considerable volumes of content exclusively for web-based distribution. The reduction of cost, complexity and other barriers to entry into web-based content publishing has also facilitated the generation and dissemination of content by individual creators. This phenomenon is perhaps best illustrated by the increasing number and popularity of commercial opportunities, referred to as e-commerce, which offer the ability to sell goods, services and information online.

While publishing platforms exist to enable individuals to create and manage e-commerce websites, setup and use of those platforms requires a level of sophistication that creates a significant barrier to entry for some potential users. In order to operate an e-commerce website, users must frequently be able to manipulate web page presentation data that controls the look and feel of the page, as well as business transaction data, such as prices and SKU numbers, that control the commercial aspects of the transaction offers published to consumers.

Currently, web page presentation data frequently resides in page presentation data stores edited from web editing suites, and business transaction data frequently resides in inventory and accounting data stores manipulated with database tools. Attempting to manage both types of data stores creates immense potential for error and frustration.

SUMMARY

Methods and apparatus for in-line editing of web page content stored in multiple data stores are described. In one embodiment, a rendering of a web page is presented in a what-you-see-is-what-you-get (WYSIWYG) editing environment. The presenting includes combining business transaction data from an inventory and accounting data store and web page presentation data from a page content data store. The presenting further includes rendering in the what-you-see-is-what-you-get environment the web page as viewable in a browser. Responsive to receiving an edit of an element of editable content from the what-you-see-is-what-you-get editing environment, the element of editable content of the electronic commerce web page is updated in both the inventory and accounting data store and the rendering.

Figure 1:
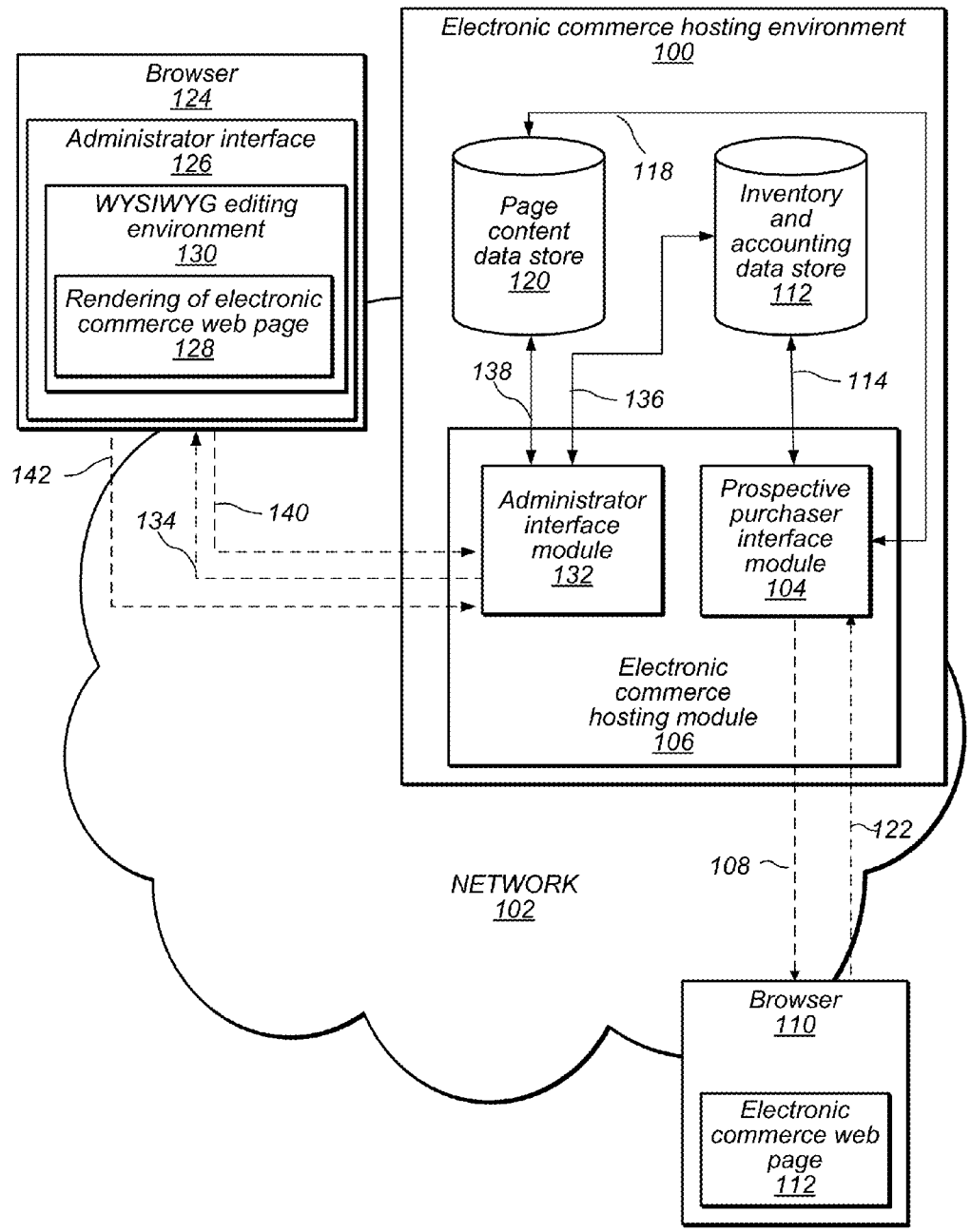
FIG. 1 illustrates an environment that may host a system for implementing in-line editing of web page content stored in multiple data stores, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Introduction to Electronic Commerce and Editing of Electronic Commerce Web Pages Electronic commerce hosting providers include companies that help people to build and run websites for selling things over the Internet. Some electronic commerce hosting providers give users access to tools designed to speed up web page creation and maintenance and to simplify the business of running a "store" on the Internet. Embodiments, non-limiting examples of which are described herein, include tools that enable customers of electronic commerce hosting providers to edit web pages and associated business data (e.g., inventory and pricing data) using a what-you-see-is-what-you-get web editing interface that updates both business data and web page presentation content in response to edits made on the a what-you-see-is-what-you-get web editing interface.

Explanatory Notes about Technical Descriptions

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While some processes or operations described herein are described as being performed by a particular module or modules, one of skill in the art will readily discern in light of having read the present disclosure that such operations or process may be performed by other modules or other computing systems without departing from the scope and intent of the present disclosure. Likewise, while some process are presented as a series of operations and are explained in a particular order, one of skill in the art will readily discern in light of having read the present disclosure that such operations or processes may be performed in an alternative order or combination without departing from the scope and intent of the present disclosure. Embodiments will combine, omit, and substitute modules and the operations that they perform or execute without departing from the scope and intent of the present disclosure. In the discussion contained herein, embodiments are described as performing operations or procedures, which may be taken to mean both performing an operation or procedure directly or supporting that operation or procedure through the processing or preparation of data for that operation or procedure.

Introduction to In-Line Editing of Web Page Content Stored in Multiple Data Stores Various embodiments of methods and apparatus for in-line editing of web page content stored in multiple data stores are presented. Some embodiments include a method for causing one or more processors to perform presenting a rendering of a web page in a what-you-see-is-what-you-get editing environment, and responsive to receiving from the what-you-see-is-what-you-get editing environment an edit of an element of editable content of the web page, updating in both a transaction data store and the rendering the element of editable content of the web page. In some embodiments, a what-you-see-is-what-you-get editing environment is an environment in which content (text and graphics) displayed onscreen during editing appears in a form closely corresponding to its appearance when published or displayed as a finished product. A what-you-see-is-what-you-get editing environment seeks to enable an editing user to see what the end user or customer will see in the finished web page, as opposed to a form dominated by a back-end interface for entering data or the display of codes and tags that show the machine language codes (e.g., HTML) presented for translation by a browser application.

In some embodiments, the presenting includes combining transaction data from a transaction data store and web page presentation data from a page content data store. In some embodiments, the presenting includes rendering in the what-you-see-is-what-you-get editing environment the web page as the web page would be viewed in a non-editing viewing environment in a browser. In some embodiments, the combining includes associating a set of elements of editable content of the web page with data editing tags describing storage locations for the plurality of elements of the editable content as transaction data in the transaction data store and associating a plurality of other elements of editable content of the web page with other data editing tags describing storage locations for the plurality of other elements of the editable content as web page presentation data in the page content data store.

Some embodiments include causing the one or more processors to perform, responsive to receiving from the what-you-see-is-what-you-get editing environment an edit of another element of editable content of the web page, updating in both the page content data store and the rendering the other element of editable content of the web page. In some embodiments, the receiving from the what-you-see-is-what-you-get editing environment the edit of the element of editable content of the web page includes receiving a single editing instruction from the what-you-see-is-what-you-get editing environment, and the updating in both the transaction data store and the rendering the element of editable content of the web page further includes updating in both the transaction data store and the rendering the element of editable content of the web page in response to the single editing instruction without subsequent instruction to perform updating in both the inventory and accounting data store and the rendering. In some such embodiments, a single instruction triggers in the editing environment both updates.

In some embodiments, the rendering in the what-you-see-is-what-you-get editing environment the web page as the web page would be viewed in the non-editing viewing environment in the browser further includes simulating an expected rendering by a selected browser application. In some embodiments, the presenting the rendering of the web page in the what-you-see-is-what-you-get editing environment further includes transmitting to a browser application the rendering of the web page in the what-you-see-is-what-you-get editing environment as an editing code layer for providing editing functions of the what-you-see-is-what-you-get editing environment, and an electronic commerce web page layer including attribute tags and excluding executable code for the what-you-see-is-what-you-get editing environment.

Some embodiments may include a means for in-line editing of web page content stored in multiple data stores. For example, a hosting module may present a rendering of a web page in a what-you-see-is-what-you-get editing environment, and responsive to receiving from the what-you-see-is-what-you-get editing environment an edit of an element of editable content of the web page, update in both transaction data store and the rendering the element of editable content of the web page, as described herein. The hosting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting a rendering of a web page in a what-you-see-is-what-you-get editing environment, and responsive to receiving from the what-you-see-is-what-you-get editing environment an edit of an element of editable content of the web page, updating in both the transaction data store and the rendering the element of editable content of the web page, as described herein. Other embodiments of the electronic commerce hosting module may be at least partially implemented by hardware circuitry and/or firmware stored, for example, in a non-volatile memory.

Introduction to In-Line Editing of Electronic Commerce Web Page Content Stored in Multiple Data Stores Some embodiments include a method for causing one or more processors to perform presenting to an administrator a rendering of an electronic commerce web page in a what-you-see-is-what-you-get editing environment, responsive to receiving an administrator edit of one of a plurality of elements of editable content from the what-you-see-is-what-you-get editing environment, updating in both an inventory and accounting data store and the rendering one of a set of elements of editable content of the electronic commerce web page, and responsive to receiving another administrator edit of one of the other elements of editable content from the what-you-see-is-what-you-get editing environment, updating in both a page content data store and the rendering the one of the other elements of editable content of the electronic commerce web page.

In some embodiments, the presenting to the administrator the rendering includes combining, using a presentation layer, business transaction data from the inventory and accounting data store, and web page presentation data from the page content data store. In some embodiments, the presenting to the administrator the rendering further includes rendering in the what-you-see-is-what-you-get environment the electronic commerce web page as viewable in presenting to a prospective purchaser. In some embodiments, the combining includes the presentation layer associating elements of editable content of the electronic commerce web page with data editing tags describing storage locations for the elements of the editable content as business transaction data in the inventory and accounting data store, and associating other elements of editable content of the electronic commerce web page with data editing tags describing storage locations for the other elements of the editable content as web page presentation data in the page content data store.

In some embodiments, the web page presentation data from the page content data store includes details of the visual layout of the electronic commerce web page, and the business transaction data from the inventory and accounting data store includes transaction details with respect to products available for purchase. In some embodiments, receiving an administrator edit of one of the elements of editable content from the what-you-see-is-what-you-get editing environment includes receiving a single editing instruction from the what-you-see-is-what-you-get editing environment. In some embodiments, updating in both the inventory and accounting data store and the rendering one of the elements of editable content of the electronic commerce web page further includes updating in both the inventory and accounting data store and the rendering one of the elements of editable content of the electronic commerce web page in response to the single editing instruction without subsequent instruction to perform updating in both the inventory and accounting data store. In some such embodiments, a single instruction triggers in the editing environment both updates.

In some embodiments, the rendering in the what-you-see-is-what-you-get environment the electronic commerce web page as viewable in presenting to a purchaser further includes simulating an expected rendering to the prospective purchaser of the electronic commerce web page by a selected browser application. In some embodiments, the presenting to the administrator the rendering of the electronic commerce web page in the what-you-see-is-what-you-get editing environment further includes transmitting to a browser application of the administrator the rendering of the electronic commerce web page in the what-you-see-is-what-you-get editing environment for display of the rendering of the electronic commerce web page in the what-you-see-is-what-you-get editing environment by the browser application of the administrator.

In some embodiments, the presenting to the administrator the rendering of the electronic commerce web page in the what-you-see-is-what-you-get editing environment further includes transmitting to a browser application of the administrator the rendering of the electronic commerce web page in the what-you-see-is-what-you-get editing environment as an editing code layer for providing editing functions of the what-you-see-is-what-you-get editing environment, and an electronic commerce web page layer including attribute tags and excluding executable code for the what-you-see-is-what-you-get editing environment.

Some embodiments include causing the one or more processors to perform transmitting to the prospective purchaser of goods the electronic commerce web page. In some embodiments, the transmitting to the prospective purchaser of goods the electronic commerce web page includes transmitting the business transaction data from the inventory and accounting data store, and the web page presentation data from the page content data store. Some embodiments include causing the one or more processors to perform, responsive to the prospective purchaser issuing a transaction instruction through the electronic commerce web page, receiving a transaction order based at least in part on an entry of business transaction data in the inventory and accounting data store.

Some embodiments include causing the one or more processors to perform creating the electronic commerce web page in an electronic commerce hosting environment in response to a request from the administrator. In some embodiments, the what-you-see-is-what-you-get editing environment is a component of an administrator interface of the electronic commerce hosting environment, and the electronic commerce web page is a prospective purchaser interface for performing electronic commerce transactions using the electronic commerce hosting environment.

Some embodiments may include a means for in-line editing of web page content stored in multiple data stores. For example, an electronic commerce hosting module may present to an administrator a rendering of an electronic commerce web page in a what-you-see-is-what-you-get editing environment, responsive to receiving an administrator edit of one of the elements of editable content from the what-you-see-is-what-you-get editing environment, update in both the inventory and accounting data store and the rendering one of the elements of editable content of the electronic commerce web page, and responsive to receiving another administrator edit of one of the other elements of editable content from the what-you-see-is-what-you-get editing environment, update in both the page content data store and the rendering the one of the other elements of editable content of the electronic commerce web page, as described herein.

The electronic commerce hosting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting to an administrator a rendering of an electronic commerce web page in a what-you-see-is-what-you-get editing environment, responsive to receiving an administrator edit of one of the elements of editable content from the what-you-see-is-what-you-get editing environment, updating in both the inventory and accounting data store and the rendering one of the elements of editable content of the electronic commerce web page, and responsive to receiving another administrator edit of one of the other elements of editable content from the what-you-see-is-what-you-get editing environment, updating in both the page content data store and the rendering the one of the other elements of editable content of the electronic commerce web page, as described herein. Other embodiments of the electronic commerce hosting module may be at least partially implemented by hardware circuitry and/or firmware stored, for example, in a non-volatile memory.

Example Implementations

FIG. 1 illustrates an environment that may host a system for implementing in-line editing of web page content stored in multiple data stores, according to some embodiments. An electronic commerce hosting environment 100 provides services to users over a network 102, such as the Internet. In one embodiment, a prospective purchaser interface 104 of an electronic commerce hosting module 106 transmits presentation data 108 across network 102 to enable browser 110 to present an electronic commerce web page 112. Presentation data 108 includes business transaction data 114 from an inventory and accounting data store 116, and web page presentation data 118 from a page content data store 120. A user of browser 110 sends transaction orders 122 to prospective purchaser interface module 104.

In order to create and maintain electronic commerce web page 112 and to process transaction orders 122, a user of browser 124 interacts with electronic commerce hosting module 106 using administrator interface 126. Electronic commerce hosting module 106 presents through administrator interface 126 a rendering of an electronic commerce web page 128 in a what-you-see-is-what-you-get editing environment 130. In presenting rendering of an electronic commerce web page 128 in a what-you-see-is-what-you-get editing environment 130, administrator interface module 132 transmits to browser 124 a rendering of the electronic commerce web page in the what-you-see-is-what-you-get editing environment 134 for display of the rendering of the electronic commerce web page 128 in the what-you-see-is-what-you-get editing environment 130 by browser 124.

Administrator interface module 120 combines business transaction data 136 from inventory and accounting data store 116 and web page presentation data 138 from page content data store 120 for transmission as a part of rendering of the electronic commerce web page in the what-you-see-is-what-you-get editing environment 134. A user makes edits 140 of one of the elements of editable content from the what-you-see-is-what-you-get editing environment 130, which administrator interface 126 transmits to administrator interface module 132. Responsive to receiving an administrator edit 140 of one of the elements of editable content from the what-you-see-is-what-you-get editing environment 130, administrator interface module updates both data 136 in the inventory and accounting data store 116 and one of the elements of editable content of the rendering of the electronic commerce web page 128. Responsive to receiving another administrator edit 142 of one of the other elements of editable content from the what-you-see-is-what-you-get editing environment 130, administrator interface module 132 updates both data 138 in the page content data store 120 and the rendering one of the other elements of editable content of the electronic commerce web page 128.

Figure 2A:
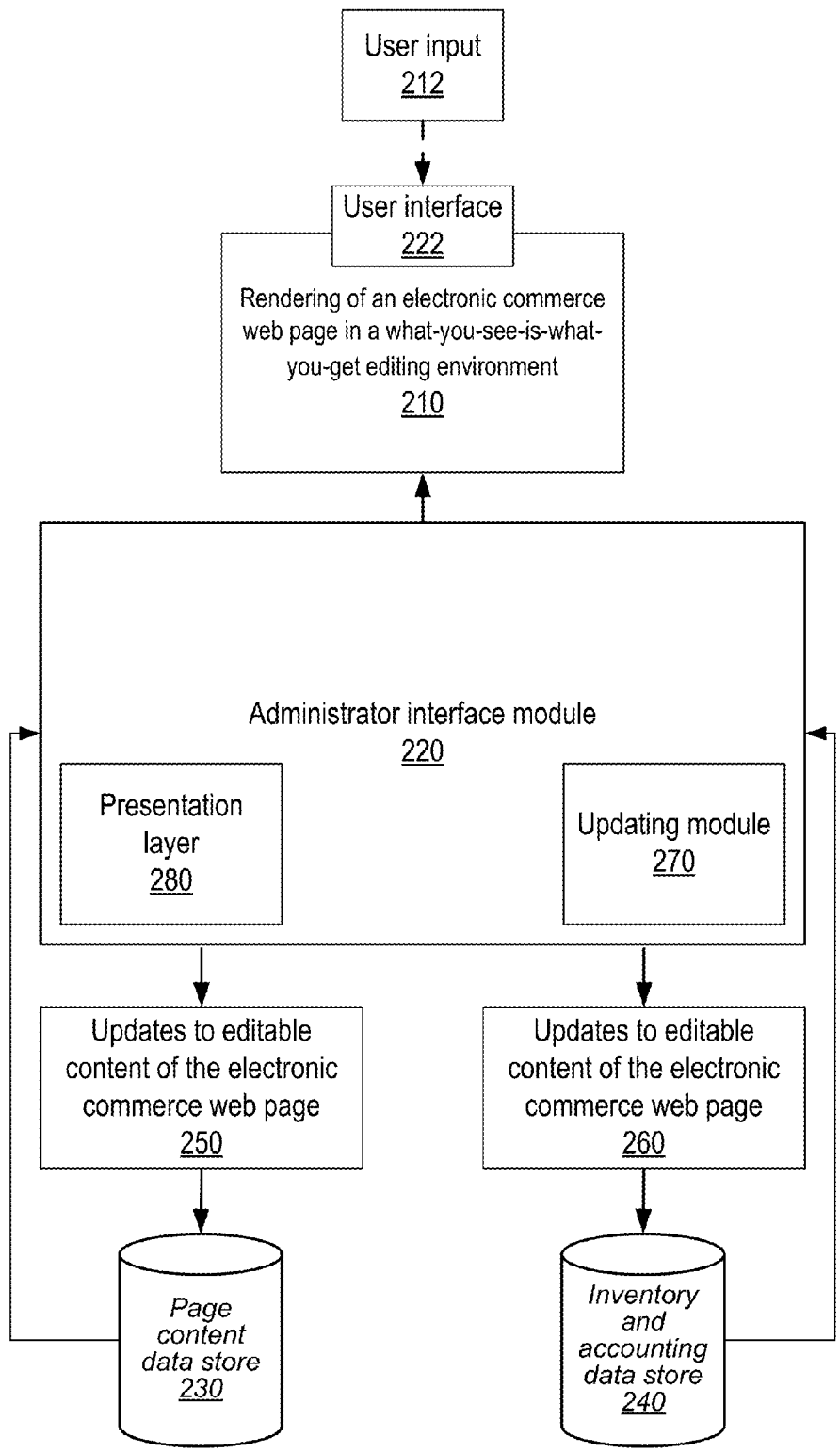
FIG. 2A depicts a module that may implement in-line editing of web page content stored in multiple data stores, according to some embodiments.
Figure 4:
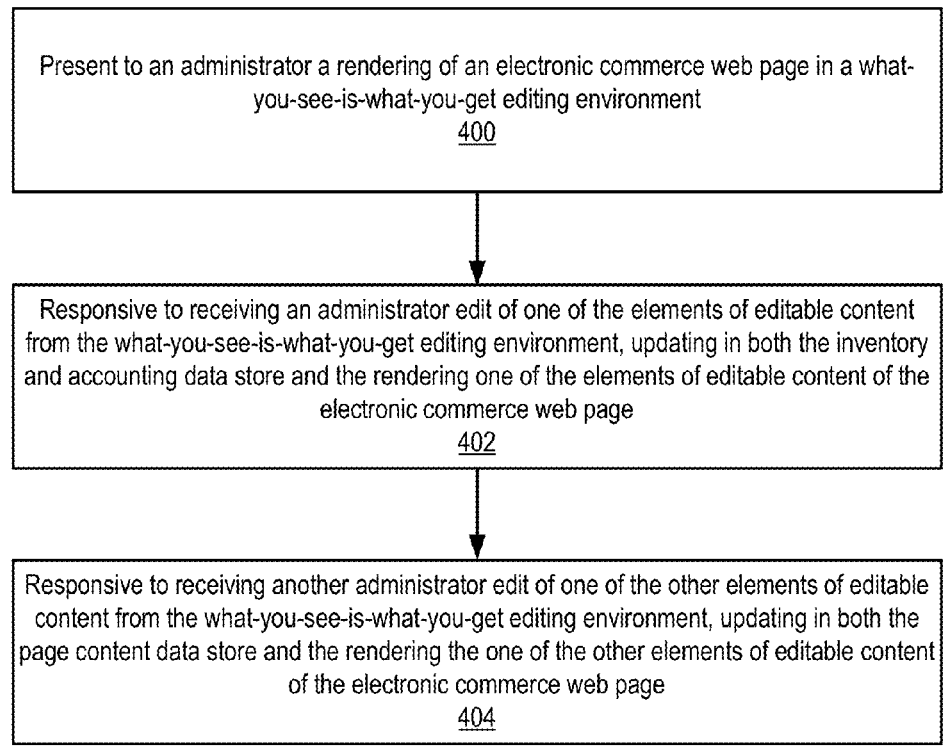
FIG. 4 is a flowchart of a process for in-line editing of web page content stored in multiple data stores, according to some embodiments.
Figure 5:
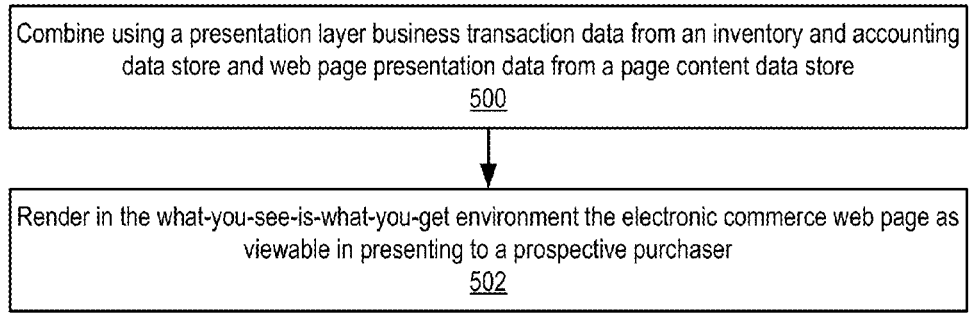
FIG. 5 is a flowchart of a process for presenting a rendering of an electronic commerce web page in a what-you-see-is-what-you-get environment for in-line editing of web page content stored in multiple data stores, according to some embodiments.
Figure 6:
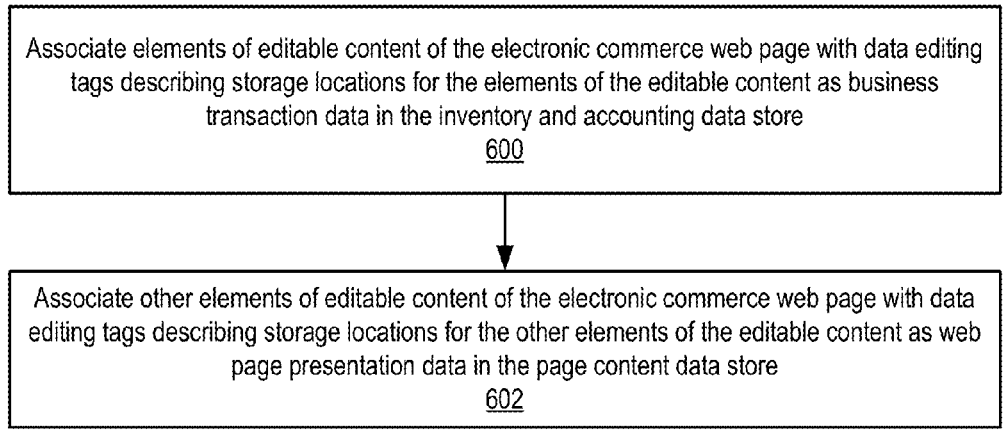
FIG. 6 is a flowchart of a process for combining web page content stored in multiple data stores for in-line editing of web page content stored in multiple data stores, according to some embodiments.
Figure 12:
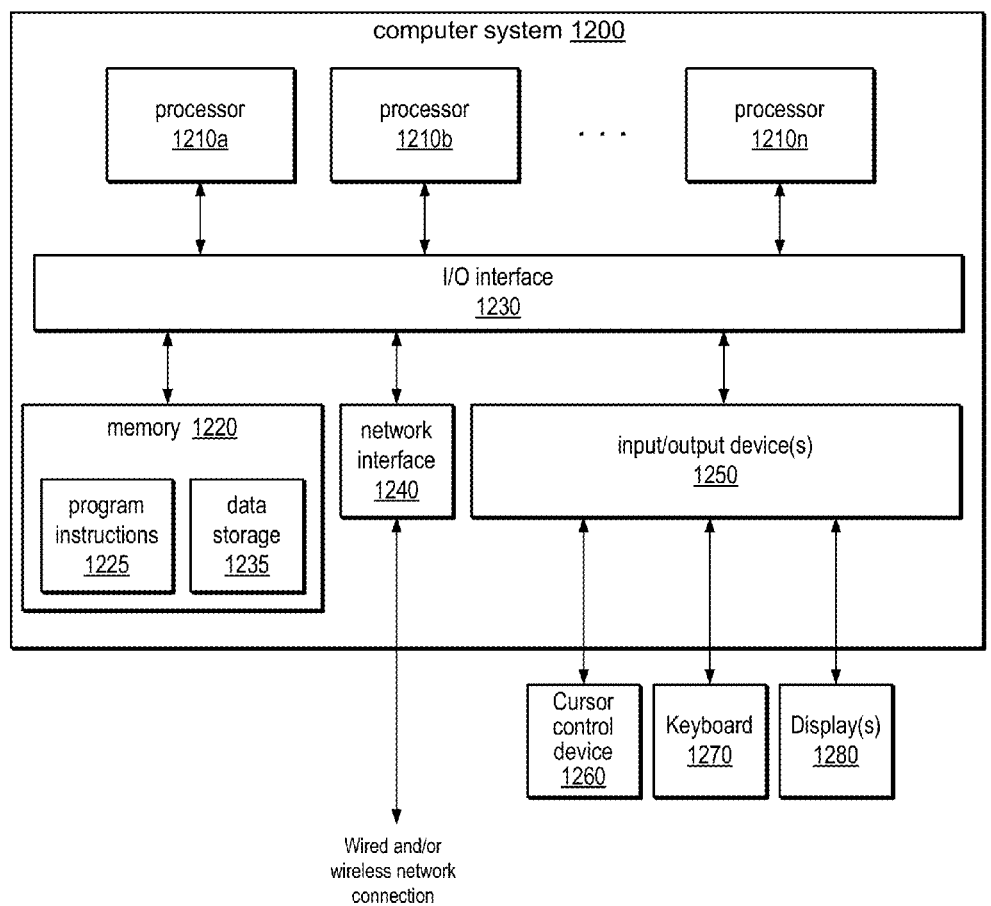
FIG. 12 depicts an example computer system that may be used in embodiments.

FIG. 2 depicts a module that may implement in-line editing of web page content stored in multiple data stores, according to some embodiments, which may implement one or more of the in-line editing techniques and tools illustrated in FIGS. 4 through 6 or described elsewhere herein. Administrator interface module 220 may, for example, implement one or more of an in-line editing tool, a what-you-see-is-what-you-get editing tool, a rendering tool, an associating tool, and a combining tool, performing functions as described herein. FIG. 12 illustrates an example computer system on which embodiments of administrator interface module 220 may be implemented. Administrator interface module 220 receives as input data from a page content data store 230 and data from an inventory and accounting data store 240.

Administrator interface module 220 may receive user input 212 activating in-line editing tool. Administrator interface module 220 then edits a rendering of an electronic commerce web page in a what-you-see-is-what-you-get editing environment 210, according to user input 212 received via user interface 222, using the activated in-line editing tool. Administrator interface module 220 generates as output updates to editable content of the electronic commerce webpage 250, which are recorded in a page content data store 230. Administrator interface module 220 also generates as output updates to editable content of the electronic commerce webpage 260, which are recorded in an inventory and accounting data store 230. The updates are likewise made to rendering of an electronic commerce web page in a what-you-see-is-what-you-get editing environment 210. Inventory and accounting data store 230 and page content data store 230 may, for example, be stored to a storage medium, such as system memory, a disk drive, DVD, CD, etc.

Administrator interface module 220 may perform or support presenting to an administrator a rendering of an electronic commerce web page in a what-you-see-is-what-you-get editing environment 210. Responsive to receiving through user interface 222 as user input 212 an administrator edit of one of the elements of editable content from the what-you-see-is-what-you-get editing environment, administrator interface module 220 may perform through an updating module 270 updating in both the inventory and accounting data store 240 and the rendering of an electronic commerce web page in a what-you-see-is-what-you-get editing environment 210 one of the elements of editable content of the electronic commerce web page, and responsive to receiving through user interface 222 as user input 212 another administrator edit of one of the other elements of editable content from the what-you-see-is-what-you-get editing environment, administrator interface module 220 may perform through updating module 270 updating in both the page content data store 230 and the rendering of the electronic commerce web page in a what-you-see-is-what-you-get editing environment 210 the one of the other elements of editable content of the electronic commerce web page.

In some embodiments, administrator interface module 220 performs combining, using a presentation layer 280, business transaction data from an inventory and accounting data store 240, and web page presentation data from a page content data store 230. In some embodiments, administrator interface module 220 performs or supports rendering in the what-you-see-is-what-you-get environment the electronic commerce web page as viewable in presenting to a prospective purchaser. In some embodiments, the combining includes the presentation layer 280 associating elements of editable content of the electronic commerce web page with data editing tags describing storage locations for the elements of the editable content as business transaction data in the inventory and accounting data store 240, and associating other elements of editable content of the electronic commerce web page with data editing tags describing storage locations for the other elements of the editable content as web page presentation data in the page content data store 230.

In some embodiments, the web page presentation data from the page content data store 230 includes details of the visual layout of the electronic commerce web page, and the business transaction data from the inventory and accounting data store 240 includes transaction details with respect to products available for purchase. In some embodiments, receiving as user input 212 at a user interface 222 an administrator edit of one of the elements of editable content from the what-you-see-is-what-you-get editing environment includes receiving a single editing instruction from the what-you-see-is-what-you-get editing environment. In some embodiments, updating in both the inventory and accounting data store 240 and the rendering of an electronic commerce web page in a what-you-see-is-what-you-get editing environment 210 one of the elements of editable content of the electronic commerce web page further includes updating in both the inventory and accounting data store 240 and the rendering of an electronic commerce web page in a what-you-see-is-what-you-get editing environment 210 one of the elements of editable content of the electronic commerce web page in response to the single editing instruction without subsequent instruction to perform updating in both the inventory and accounting data store 240 and the rendering of an electronic commerce web page in a what-you-see-is-what-you-get editing environment 210.

In some embodiments, the rendering in the what-you-see-is-what-you-get environment the electronic commerce web page as viewable in presenting to a purchaser further includes simulating an expected rendering to the prospective purchaser of the electronic commerce web page by a selected browser application. In some embodiments, the presenting to the administrator the rendering of an electronic commerce web page in a what-you-see-is-what-you-get editing environment 210 further includes transmitting to a browser application of the administrator the rendering of the electronic commerce web page in the what-you-see-is-what-you-get editing environment for display of the rendering of an electronic commerce web page in a what-you-see-is-what-you-get editing environment 210 by the browser application of the administrator.

In some embodiments, the presenting to the administrator the rendering of an electronic commerce web page in a what-you-see-is-what-you-get editing environment 210 further includes transmitting to a browser application of the administrator the rendering of the electronic commerce web page in the what-you-see-is-what-you-get editing environment as an editing code layer for providing editing functions of the what-you-see-is-what-you-get editing environment, and an electronic commerce web page layer including attribute tags and excluding executable code for the what-you-see-is-what-you-get editing environment.

In some embodiments, administrator interface module 220 creates the electronic commerce web page in an electronic commerce hosting environment in response to a request from the administrator. In some embodiments, the what-you-see-is-what-you-get editing environment is a component of an administrator interface of the electronic commerce hosting environment presented by administrator interface module 220, and the electronic commerce web page is a prospective purchaser interface for performing electronic commerce transactions using the electronic commerce hosting environment.

Figure 2B:
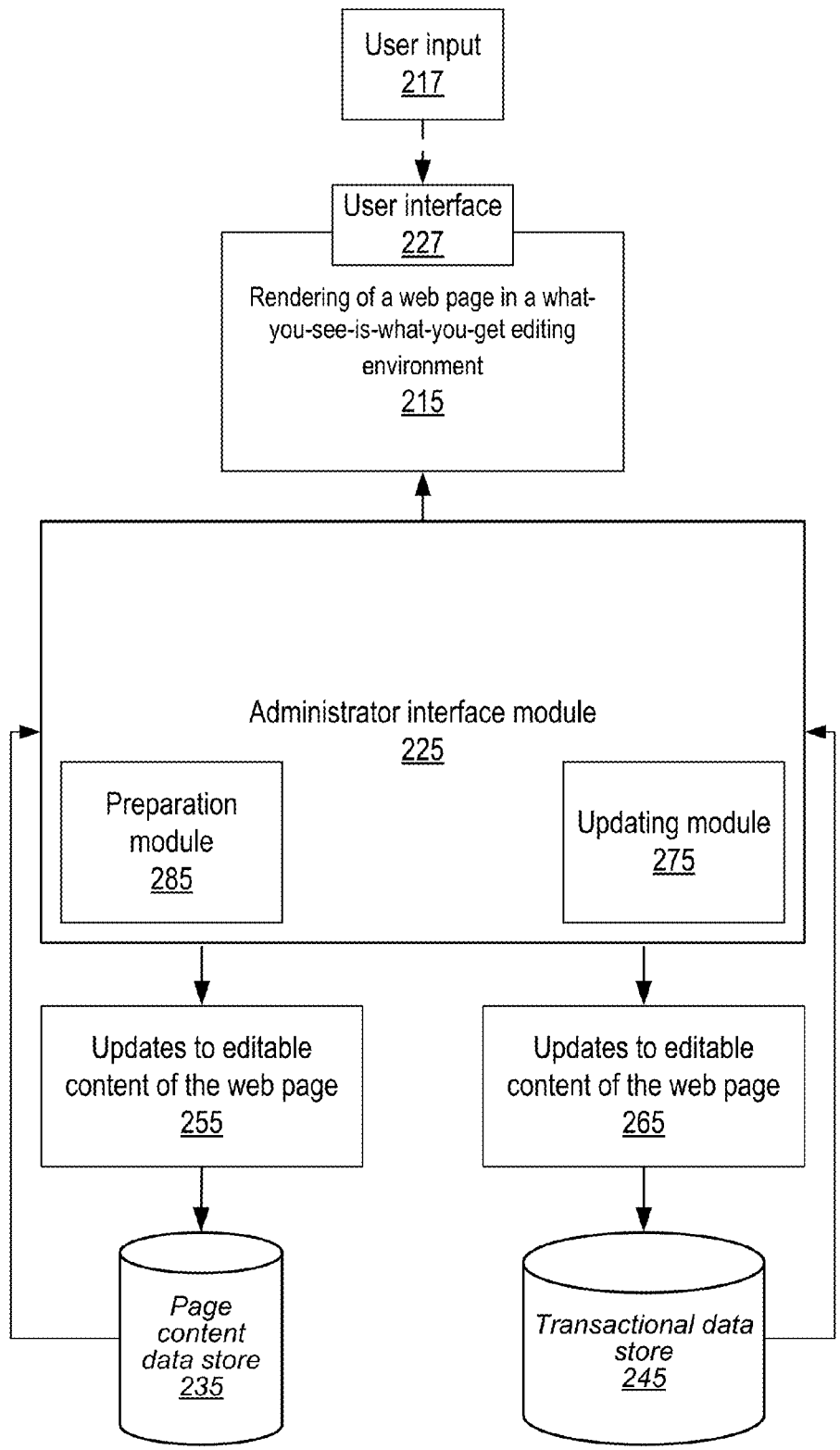
FIG. 2B illustrates a module that may implement in-line editing of web page content stored in multiple data stores, according to some embodiments.

FIG. 2B depicts a module that may implement in-line editing of web page content stored in multiple data stores, according to some embodiments, which may implement one or more of the in-line editing techniques and tools illustrated in FIGS. 4 through 6 or similar techniques and tools. While the administrator interface module of FIG. 2A has been shown with respect to an electronic commerce hosting environment, the administrator interface module of FIG. 2B is designed for application to a broader class of network-based content publishing environments, as discussed below with respect to FIG. 3B. Administrator interface module 225 may, for example, implement one or more of an in-line editing tool, a what-you-see-is-what-you-get editing tool, a rendering tool, an associating tool, and a combining tool, performing functions as described herein. FIG. 12 illustrates an example computer system on which embodiments of administrator interface module 225 may be implemented. Administrator interface module 225 receives as input data from a page content data store 235 and data from a transactional data store 245.

Administrator interface module 225 may receive user input 217 activating in-line editing tool. Administrator interface module 225 then edits a rendering of a web page in a what-you-see-is-what-you-get editing environment 215, according to user input 217 received via user interface 227, using the activated in-line editing tool. Administrator interface module 225 generates as output updates to editable content of the webpage 255, which are recorded in a page content data store 235. Administrator interface module 225 also generates as output updates to editable content of the webpage 265, which are recorded in a transactional data store 235. The updates are also made in the rendering of the web page in the what-you-see-is-what-you-get editing environment 215. Transactional data store 245 and page content data store 235 may, for example, be stored to a storage medium, such as system memory, a disk drive, DVD, CD, etc. Web pages edited using administrator interface module may include all manner of information presentation over a network, including enterprise applications, social networks, static media presentations, audio and video streaming, and other functions performed over the world wide web.

In some embodiments, administrator interface module 225 performs presenting a rendering of a web page in a what-you-see-is-what-you-get editing environment 215, and responsive to receiving as user input 217 at a user interface 227 of the what-you-see-is-what-you-get editing environment an edit of an element of editable content of the web page, updating in both the transactional data store 245 and the rendering the element of editable content of the web page. In some embodiments, a what-you-see-is-what-you-get editing environment is an environment in which content (text and graphics) displayed onscreen during editing appears in a form closely corresponding to its appearance when published or displayed as a finished product. A what-you-see-is-what-you-get editing environment seeks to enable an editing user to see what the end user or customer will see in the finished web page, as opposed to a form dominated by a back-end interface for entering data or the display of codes and tags that show the machine language codes (e.g., HTML) presented for translation by a browser application.

In some embodiments, administrator interface module 225 performs through a preparation module 285 combining transaction data from the transaction data store 245 and web page presentation data from a page content data store 235. In some embodiments, administrator interface module 225 performs rendering in the what-you-see-is-what-you-get editing environment the web page as the web page would be viewed in a non-editing viewing environment in a browser. In some embodiments, the combining includes associating a set of elements of editable content of the web page with data editing tags describing storage locations for the plurality of elements of the editable content as transaction data in the transaction data store 245 and associating a plurality of other elements of editable content of the web page with other data editing tags describing storage locations for the plurality of other elements of the editable content as web page presentation data in the page content data store 235.

In some embodiments administrator interface module 225 performs through an updating module 275, responsive to receiving from the what-you-see-is-what-you-get editing environment an edit of one a set of other elements of editable content of the web page, updating in both the page content data store 235 and the rendering the one of the other elements of editable content of the web page. In some embodiments, the receiving from the what-you-see-is-what-you-get editing environment the edit of the element of editable content of the web page includes receiving a single editing instruction as user input 217 from the user interface 227 of the what-you-see-is-what-you-get editing environment, and the updating in both the transaction data store and the rendering the element of editable content of the web page further includes the updating module 275 updating in both the transaction data store 245 and the rendering the element of editable content of the web page in response to the single editing instruction without subsequent instruction to perform updating in both the transaction data store 245 and the rendering 215.

In some embodiments the rendering in the what-you-see-is-what-you-get editing environment the web page as the web page would be viewed in the non-editing viewing environment in the browser further includes administrator interface module 225 simulating an expected rendering by a selected browser application. In some embodiments, the presenting the rendering of the web page in the what-you-see-is-what-you-get editing environment further includes administrator interface module 225 transmitting to a browser application of the administrator the rendering of the web page in the what-you-see-is-what-you-get editing environment as an editing code layer for providing editing functions of the what-you-see-is-what-you-get editing environment, and an electronic commerce web page layer including attribute tags and excluding executable code for the what-you-see-is-what-you-get editing environment.

Figure 3A:
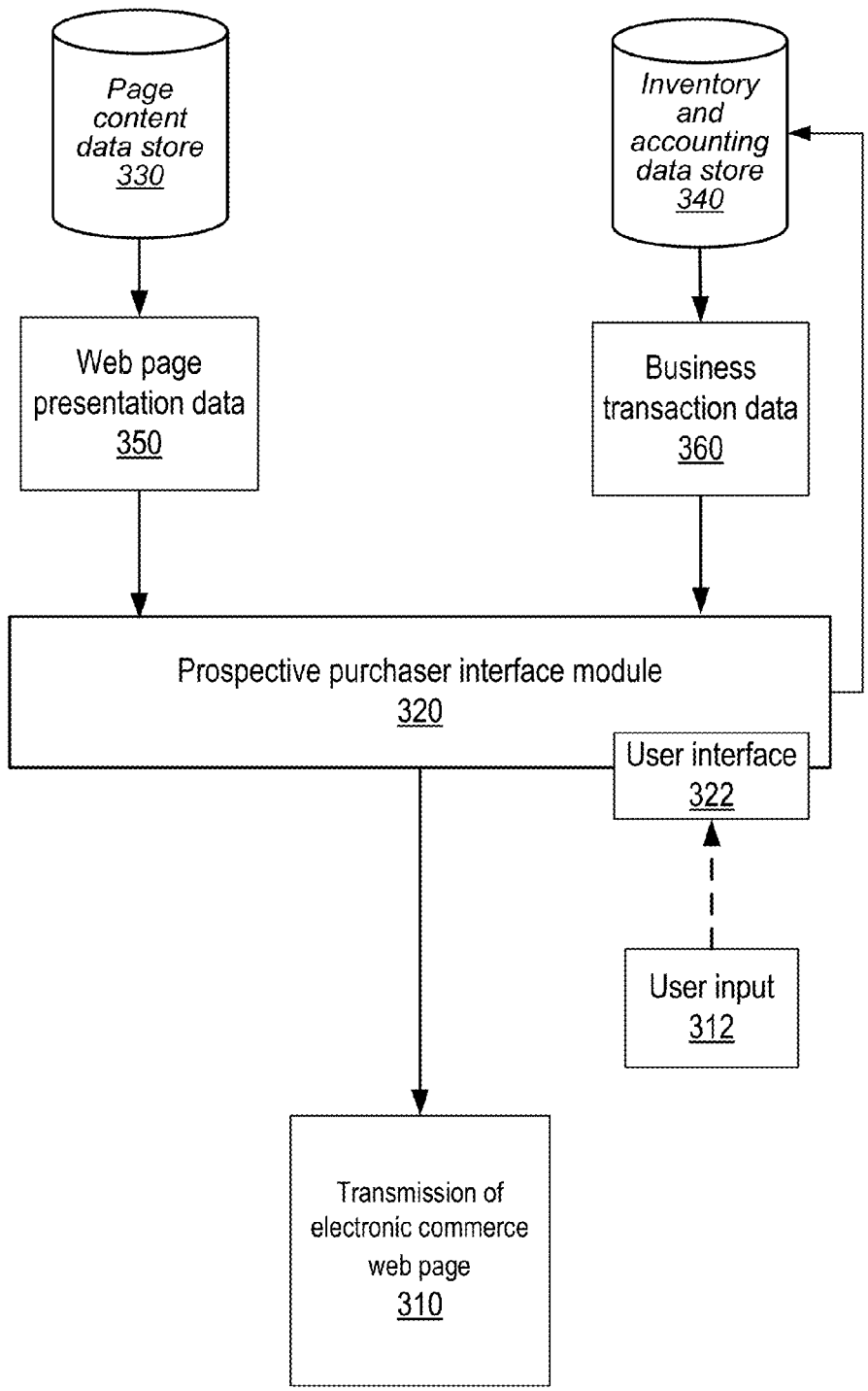
FIG. 3A depicts a module that may implement delivery of web page content resulting from in-line editing of web page content stored in multiple data stores, according to some embodiments.

FIG. 3A illustrates a module that may implement delivery of web page content resulting from in-line editing of web page content stored in multiple data stores, according to some embodiments. Prospective purchaser interface module 320 may, for example, implement an online publishing tool, a web server, or a mobile device application. FIG. 12 illustrates an example computer system on which embodiments of prospective purchaser interface module 320 may be implemented. Prospective purchaser interface module 320 receives as input web page presentation data 350 from a page content data store 330 and business transaction data 360 from an inventory and accounting data store 340. Prospective purchaser interface module 320 may receive user input 312 activating a online publishing tool, a web server, or a mobile device application. An example of user input 312 might be a request for transmission of an electronic commerce web page 310 or a request to create an electronic transaction.

Prospective purchaser interface module 320 then combines web page presentation data 350 from a page content data store 330 and business transaction data 360 from an inventory and accounting data store 340, according to user input 312 received via user interface 322, and prepares transmission of an electronic commerce webpage 310. The user may provide further input, to create a transaction or to request transmission of another web page. Prospective purchaser interface module 320 may, for example, store user input 312 to inventory and accounting data store 345, for example to record a transaction.

In some embodiments, prospective purchaser interface module 320 transmits to the prospective purchaser of goods the electronic commerce web page 310. In some embodiments, the transmitting to the prospective purchaser of goods the electronic commerce web page 310 includes transmitting the business transaction data 360 from the inventory and accounting data store 340, and the web page presentation data 350 from the page content data store 330. In some embodiments, prospective purchaser interface module 320, responsive to the prospective purchaser issuing a transaction instruction as user input 312 through the electronic commerce web page, receives a transaction order based at least in part on an entry of business transaction data 360 in the inventory and accounting data store 340.

Figure 3B:
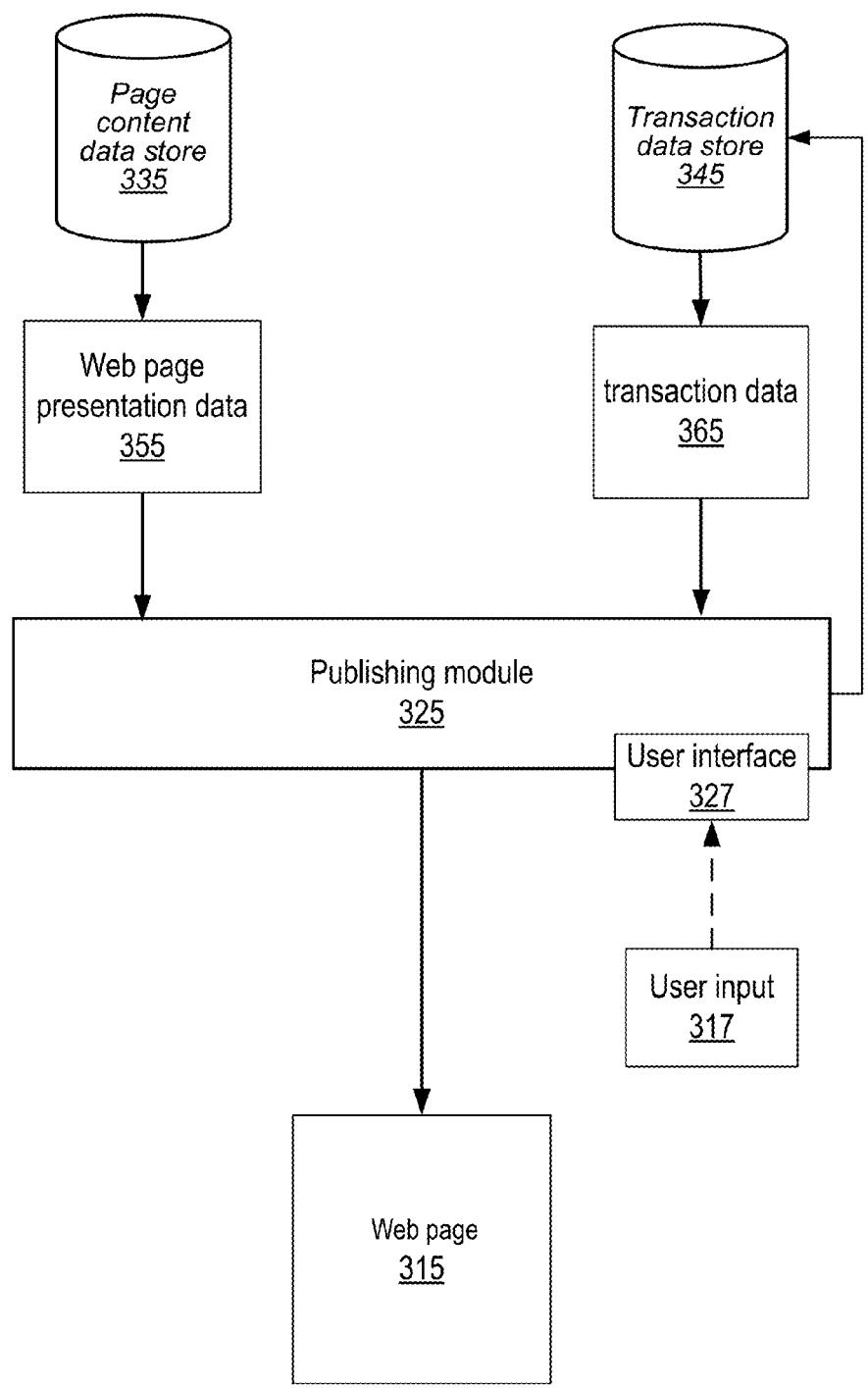
FIG. 3B illustrates a module that may implement delivery of web page content resulting from in-line editing of web page content stored in multiple data stores, according to some embodiments.

FIG. 3B illustrates a module that may implement delivery of web page content resulting from in-line editing of web page content stored in multiple data stores, according to some embodiments. Publishing module 325 may, for example, implement an online publishing tool, a web server, or a mobile device application. FIG. 12 illustrates an example computer system on which embodiments of publishing module 325 may be implemented. Publishing module 325 receives as input web page presentation data 355 from a page content data store 335 and business transaction data 365 from a transaction data store 345. Publishing module 325 may receive user input 317 activating a online publishing tool, a web server, or a mobile device application. An example of user input 317 might be a request for transmission of an electronic commerce web page 310 or a request to perform a transaction.

Publishing module 325 then combines web page presentation data 355 from page content data store 335 and transaction data 365 from transaction data store 340, according to user input 317 received via user interface 327, and prepares transmission of a web page 315. The user may provide further input, to create a transaction or to request transmission of another web page. Prospective purchaser interface module 325 may, for example, store user input 317 to transaction data store, for example to record a transaction.

In some embodiments, publishing module 325 transmits the web page 315. In some embodiments, the transmitting the web page 315 includes transmitting transaction data 365 from the transaction data store 345, and the web page presentation data 355 from the page content data store 335. In some embodiments, publishing module 325, responsive to a user issuing instruction as user input 317 through the web page, receives an order based at least in part on an entry of transaction data 365 in the transaction data store 345.

FIG. 4 is a flowchart of a process for in-line editing of web page content stored in multiple data stores, according to some embodiments. A rendering of an electronic commerce web page in a what-you-see-is-what-you-get editing environment is presented to an administrator (block 400). Responsive to receiving an administrator edit of one of the elements of editable content from the what-you-see-is-what-you-get editing environment, one of the elements of editable content of the electronic commerce web page is updated in both the inventory and accounting data store and the rendering (block 402). Responsive to receiving another administrator edit of one of the other elements of editable content from the what-you-see-is-what-you-get editing environment, the one of the other elements of editable content of the electronic commerce web page is updated in both the page content data store and the rendering (block 404).

FIG. 5 is a flowchart of a process for presenting a rendering of an electronic commerce web page in a what-you-see-is-what-you-get environment for in-line editing of web page content stored in multiple data stores, according to some embodiments. Business transaction data from an inventory and accounting data store and web page presentation data from a page content data store are combined using a presentation layer (block 500). The electronic commerce web page is rendered in the what-you-see-is-what-you-get environment as viewable in presenting to a prospective purchaser (block 502).

FIG. 6 is a flowchart of a process for combining web page content stored in multiple data stores for in-line editing of web page content stored in multiple data stores, according to some embodiments. Elements of editable content of the electronic commerce web page are associated with data editing tags describing storage locations for the elements of the editable content as business transaction data in the inventory and accounting data store (block 600). Other elements of editable content of the electronic commerce web page are associated with data editing tags describing storage locations for the other elements of the editable content as web page presentation data in the page content data store (block 602).

Figure 7:
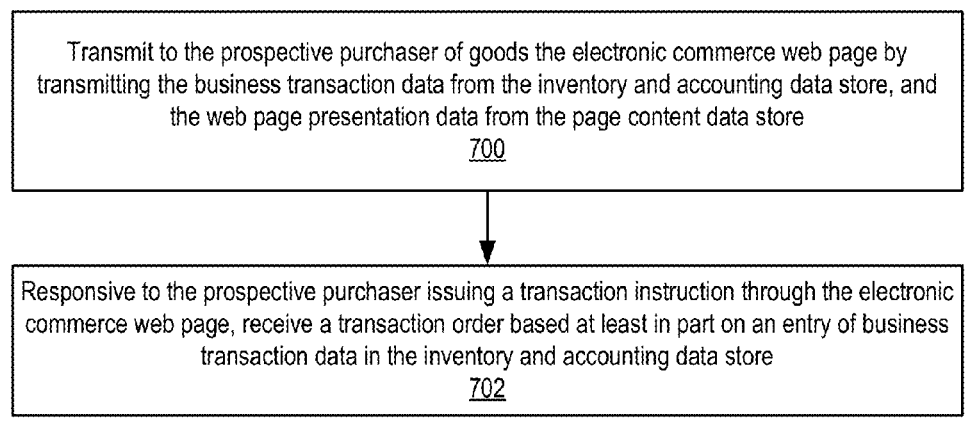
FIG. 7 is a flowchart of a process presenting to a prospective purchaser an electronic commerce web page edited in a what-you-see-is-what-you-get environment for in-line editing of web page content stored in multiple data stores, according to some embodiments.

FIG. 7 is a flowchart of a process presenting to a prospective purchaser an electronic commerce web page edited in a what-you-see-is-what-you-get environment for in-line editing of web page content stored in multiple data stores, according to some embodiments. The electronic commerce web page is transmitted to the prospective purchaser of goods by transmitting the business transaction data from the inventory and accounting data store, and the web page presentation data from the page content data store (block 700). Responsive to the prospective purchaser issuing a transaction instruction through the electronic commerce web page, a transaction order based at least in part on an entry of business transaction data in the inventory and accounting data store is received (block 702).

Figure 8:
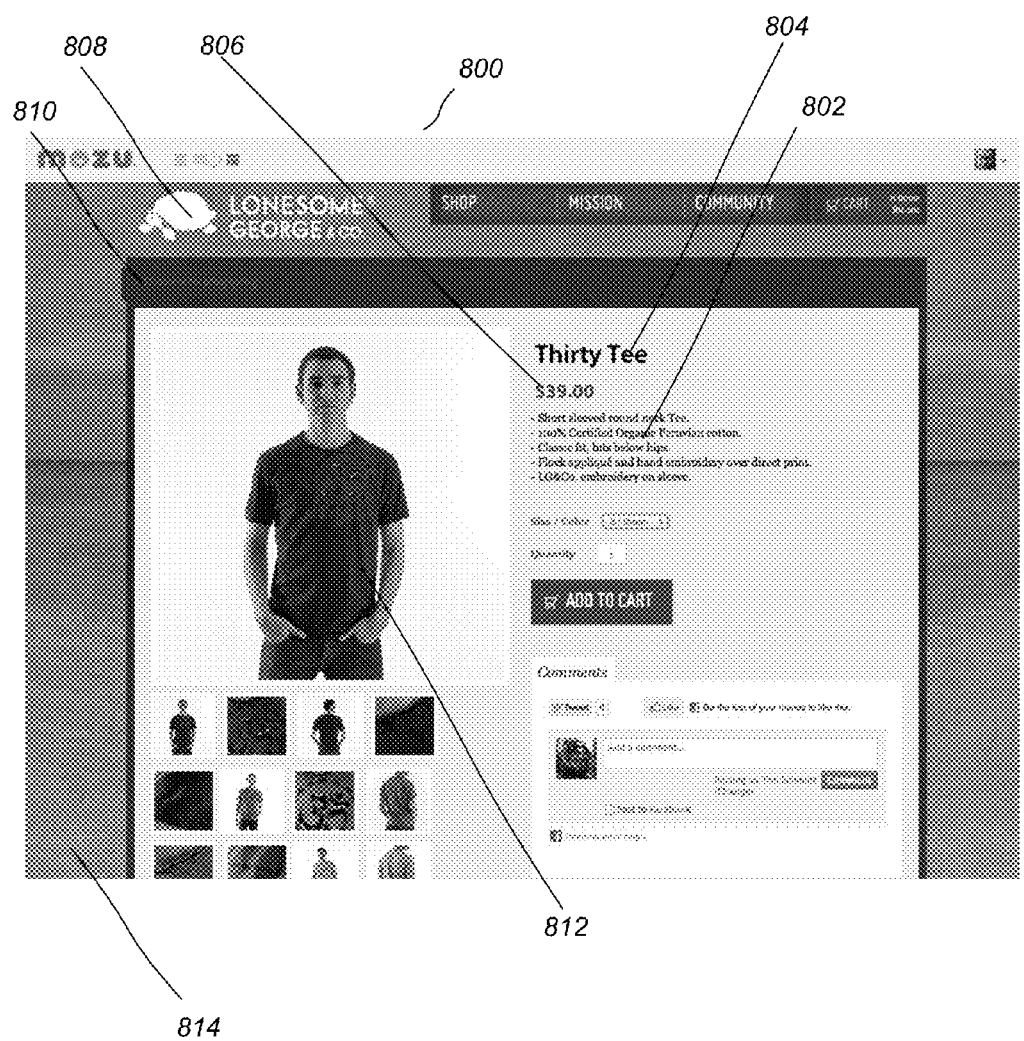
FIG. 8 depicts a user interface that may implement in-line editing of web page content stored in multiple data stores, according to some embodiments.

FIG. 8 depicts a user interface that may implement in-line editing of web page content stored in multiple data stores, according to some embodiments. A rendering of an electronic commerce web page in a what-you-see-is-what-you-get editing environment 800 is shown. The rendering of the electronic commerce web page in the what-you-see-is-what-you-get editing environment 800 includes an item description 802, an item name 804, and a price 806. Each of item description 802, item name 804, and price 806 is an item of business transaction data from an inventory and accounting data store. Each of item description 802, item name 804, and price 806 is likewise editable content of the electronic commerce web page. The rendering of the electronic commerce web page in the what-you-see-is-what-you-get editing environment 800 further includes logo art 808, a navigation control 810, an item presentation graphic 812, and a background graphic 814. Each of logo art 808, navigation control 810, item presentation graphic 812, and background graphic 814 is an item of web page presentation data from a page content data store. Each of logo art 808, navigation control 810, item presentation graphic 812, and background graphic 814 is likewise editable content of the electronic commerce web page.

Figure 9:
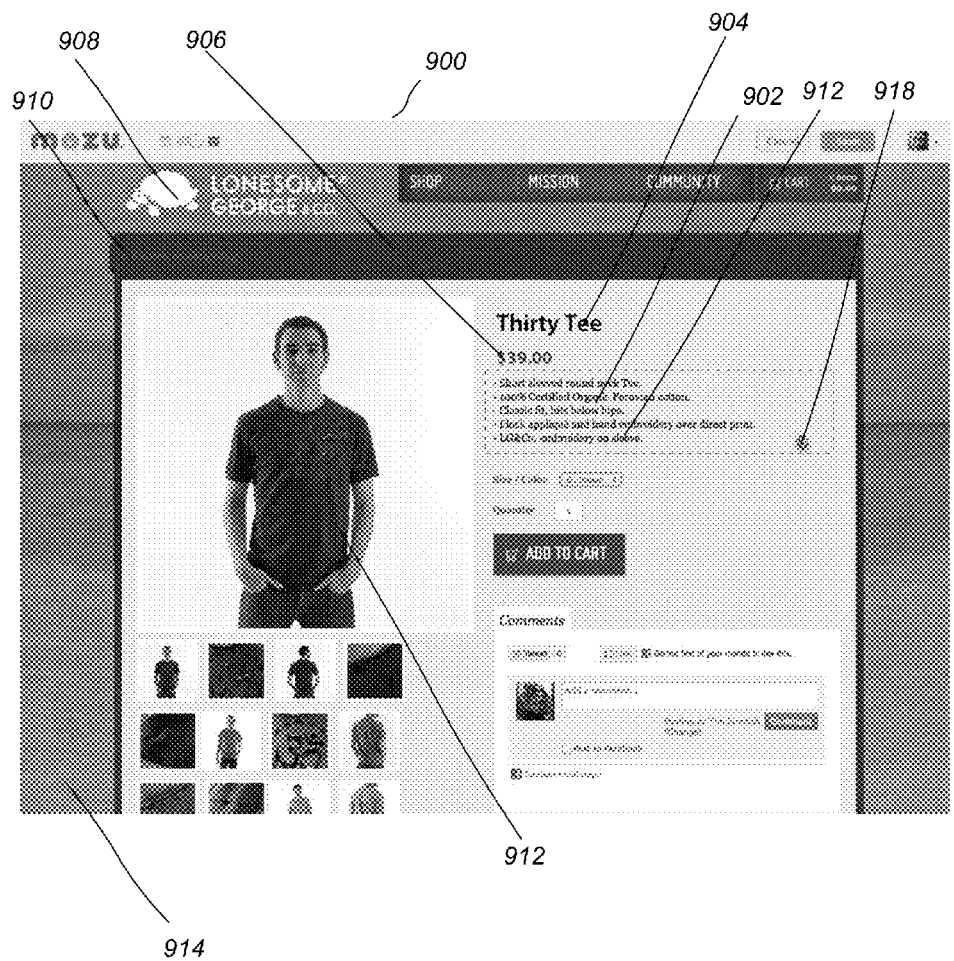
FIG. 9 illustrates a user interface that may implement in-line editing of web page content stored in multiple data stores, according to some embodiments.

FIG. 9 illustrates a user interface that may implement in-line editing of web page content stored in multiple data stores, according to some embodiments. A rendering of an electronic commerce web page in a what-you-see-is-what-you-get editing environment 900 is shown. The rendering of the electronic commerce web page in the what-you-see-is-what-you-get editing environment 900 includes an item description 902, an item name 904, and a price 906. Each of item description 902, item name 904, and price 906 is an item of business transaction data from an inventory and accounting data store. Each of item description 902, item name 904, and price 906 is likewise editable content of the electronic commerce web page. The rendering of the electronic commerce web page in the what-you-see-is-what-you-get editing environment 900 further includes logo art 908, a navigation control 910, an item presentation graphic 912, and a background graphic 914. Each of logo art 908, navigation control 910, item presentation graphic 912, and background graphic 914 is an item of web page presentation data from a page content data store. Each of logo art 908, navigation control 910, item presentation graphic 912, and background graphic 914 is likewise editable content of the electronic commerce web page. A selection gesture is performed to delete content 916 from item description 902 using pointer 918.

Figure 10:
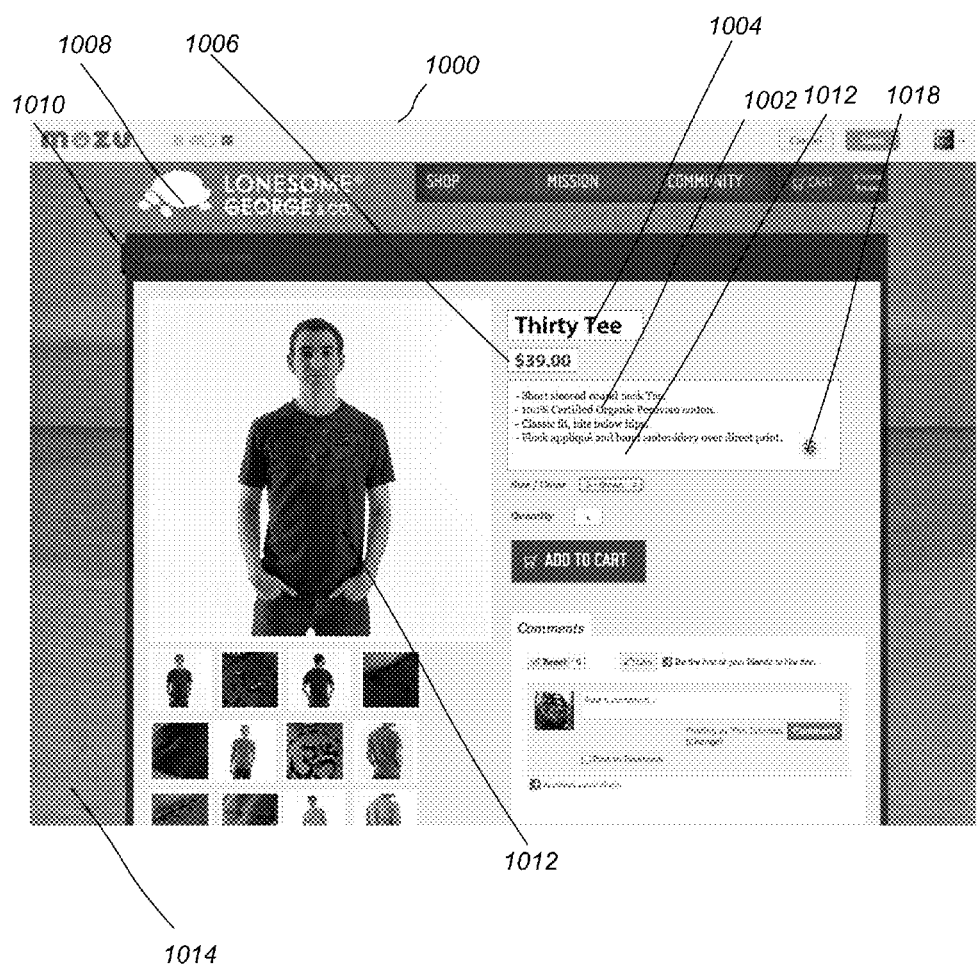
FIG. 10 depicts a user interface that may implement in-line editing of web page content stored in multiple data stores, according to some embodiments.

FIG. 10 depicts a user interface that may implement in-line editing of web page content stored in multiple data stores, according to some embodiments. A rendering of an electronic commerce web page in a what-you-see-is-what-you-get editing environment 1000 is shown. The rendering of the electronic commerce web page in the what-you-see-is-what-you-get editing environment 1000 includes an item description 1002, an item name 1004, and a price 1006. Each of item description 1002, item name 1004, and price 1006 is an item of business transaction data from an inventory and accounting data store. Each of item description 1002, item name 1004, and price 1006 is likewise editable content of the electronic commerce web page. The rendering of the electronic commerce web page in the what-you-see-is-what-you-get editing environment 1000 further includes logo art 1008, a navigation control 1010, an item presentation graphic 1012, and a background graphic 1014. Each of logo art 1008, navigation control 1010, item presentation graphic 1012, and background graphic 1014 is an item of web page presentation data from a page content data store. Each of logo art 1008, navigation control 1010, item presentation graphic 1012, and background graphic 1014 is likewise editable content of the electronic commerce web page. An empty space 1016 is indicated, where content was deleted from item description 1002 using pointer 1018. In response to the selection gesture depicted in FIG. 9, rendering of the electronic commerce web page in the what-you-see-is-what-you-get editing environment 1000 was updated, and data for item description 1002 in the inventory and accounting data store (not shown) was also updated. In some embodiments, updating in both the inventory and accounting data store and the rendering 1000 is performed in response to the single editing instruction without subsequent instruction to perform updating in both the rendering and the inventory and accounting data store.

Figure 11:
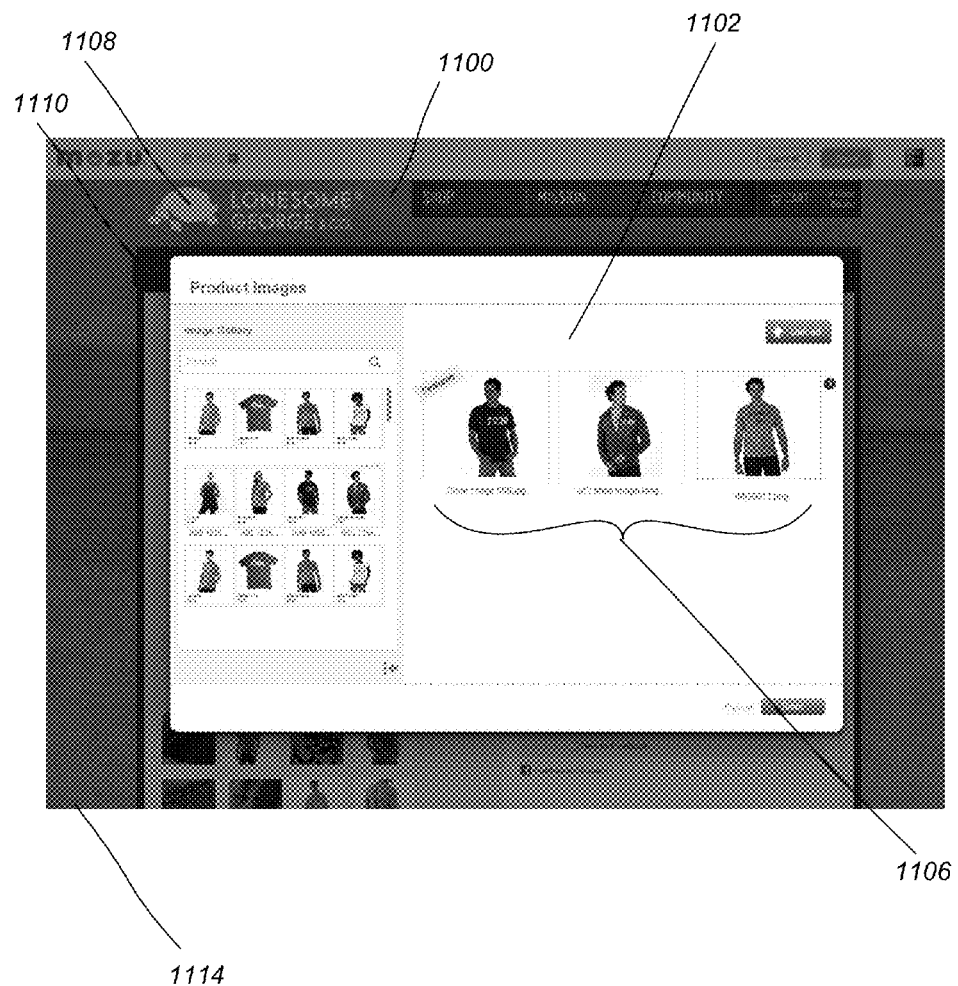
FIG. 11 illustrates a user interface that may implement in-line editing of web page content stored in multiple data stores, according to some embodiments.

FIG. 11 will be described below with respect to actions taken after a selection gesture to indicate a desire to edit or modify item presentation graphic 1012.

FIG. 11 illustrates a user interface that may implement in-line editing of web page content stored in multiple data stores, according to some embodiments. A rendering of an electronic commerce web page in a what-you-see-is-what-you-get editing environment 1100 is shown behind an image selection dialogue box 1102. The rendering of the electronic commerce web page in the what-you-see-is-what-you-get editing environment 1000 includes an item description (obscured by dialogue box 1102), an item name (obscured by dialogue box 1102), and a price (obscured by dialogue box 1102). Each of item description, item name, and price is an item of business transaction data from an inventory and accounting data store. Each of item description, item name, and price is likewise editable content of the electronic commerce web page.

The rendering of the electronic commerce web page in the what-you-see-is-what-you-get editing environment 1100 further includes logo art 1108, a navigation control 1110, an item presentation graphic (obscured by dialogue box 1102), and a background graphic 1114. Each of logo art 1108, navigation control 1110, item presentation graphic, and background graphic 1114 is an item of web page presentation data from a page content data store. Each of logo art 1108, navigation control 1110, item presentation graphic, and background graphic 1114 is likewise editable content of the electronic commerce web page.

In response to the selection gesture (not shown) to change the item presentation graphic, rendering of the electronic commerce web page in the what-you-see-is-what-you-get editing environment 1100 presents dialogue box 1102 for selecting a new item presentation graphic from among several graphics 1106. Selection of a new item presentation graphic from graphics 1106 results in changes to rendering of the electronic commerce web page in the what-you-see-is-what-you-get editing environment 1100. As a result, rendering of the electronic commerce web page in the what-you-see-is-what-you-get editing environment 1100 is updated, and data identifying item presentation graphic in the web page presentation data from the page content data store (not shown) is also updated. In some embodiments, updating in both the page content data store and the rendering 1100 is performed in response to the single editing instruction without subsequent instruction to perform updating in both the rendering and the inventory and accounting data store.

Example System

Embodiments of an in-line editing module, an electronic commerce hosting environment and/or of the various web page editing techniques as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a in-line editing module or an electronic commerce hosting environment are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of an in-line editing module or an electronic commerce hosting environment as described herein, and data storage 1235, comprising various data accessible by program instructions 1225. In one embodiment, program instructions 1225 may include software elements of embodiments of a an in-line editing module or an electronic commerce hosting environment as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of a an in-line editing module or an electronic commerce hosting environment as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
causing one or more processors to perform:
an administrator interface module presenting a rendering of an electronic commerce web page in a what-you-see-is-what-you-get editing environment, wherein
the presenting comprises combining
business transaction data from a business transaction data store, and
web page presentation data from a page content data store, and
the combining comprises
associating one or more elements of editable content of the web page with one or more data editing tags that describe storage locations for one or more elements of the editable content as transaction data in a data store, and
associating one or more other elements of editable content of the web page with one or more other data editing tags that describe storage locations for the one or more other elements of the editable content as web page presentation data in the page content data store;
the business transaction data store comprises pricing data presented to a customer of an electronic commerce web page in a course of a business transaction, and
the presenting further comprises rendering in the what-you-see-is-what-you-get editing environment the web page as the web page would be viewed by a business transaction customer in a non-editing viewing environment in a browser during a business transaction;
responsive to receiving from the what-you-see-is-what-you-get editing environment an edit of an element of editable content displayable on the web page during the business transaction, updating in both the business transaction data store and the rendering, the element of editable content;
a prospective purchaser interface module transmitting to a prospective purchaser of goods the electronic commerce web page, wherein
the transmitting to the prospective purchaser of goods the electronic commerce web page comprises transmitting
the business transaction data from the business transaction data store, and
the web page presentation data from the page content data store; and
responsive to the prospective purchaser issuing a transaction instruction through the electronic commerce web page,
receiving a transaction order based at least in part on an entry of business transaction data in the business transaction data store.

2. The method of claim 1, further comprising, responsive to receiving from the what-you-see-is-what-you-get editing environment an edit of one a plurality of other elements of editable content of the web page, updating in both the page content data store and the rendering, the one of the other elements of editable content of the web page.

3. The method of claim 1, wherein
the receiving from the what-you-see-is-what-you-get editing environment the edit of the element of editable content of the web page comprises receiving a single editing instruction from the what-you-see-is-what-you-get editing environment, and
the updating in both the business transaction data store and the rendering, the element of editable content further comprises updating in both the business transaction data store and the rendering, the element of editable content in response to the single editing instruction without subsequent instruction to perform updating in both the business transaction data store and the rendering.

4. The method of claim 1, wherein the rendering in the what-you-see-is-what-you-get editing environment the web page as the web page would be viewed in the non-editing viewing environment in the browser further comprises simulating an expected rendering by a selected browser application.

5. The method of claim 1, wherein the presenting the rendering of the web page in the what-you-see-is-what-you-get editing environment further comprises transmitting to a browser application the rendering of the web page in the what-you-see-is-what-you-get editing environment as
an editing code layer for providing editing functions of the what-you-see-is-what-you-get editing environment, and
a web page layer.

6. The method of claim 1, further comprising delivering, by a publishing module, web page content resulting from said edit of the element of editable content.

7. A system, comprising:
at least one processor; and
a memory comprising program instructions, wherein the program instructions are executed by at least one processor to implement an administrator interface module configured to:
present a rendering of an electronic commerce web page in a what-you-see-is-what-you-get editing environment, wherein:
the program instructions are executed by at least one processor to combine:
business transaction data from a transaction data store, and
web page presentation data from a page content data store, and
to combine comprises:
associate one or more elements of editable content of the web page with one or more data editing tags describing storage locations for one or more elements of the editable content as transaction data in the transaction data store, and associate one or more other elements of editable content of the web page with one or more other data editing tags describing storage locations for the one or more other elements of the editable content as web page presentation data in the page content data store; and the business transaction data store comprises pricing data presented to a customer of the electronic commerce web page in a course of a business transaction, wherein the administrator interface module is further configured to render in the what-you-see-is-what-you-get editing environment the web page as the web page would be viewed by a business transaction customer in a non-editing viewing environment in a browser during a business transaction;

and wherein the program instructions are further executed to:

responsive to receiving from the what-you-see-is-what-you-get editing environment an edit of an element of editable content displayable on the web page during the business transaction, update in both the business transaction data store and the rendering, the element of editable content; and implement a prospective purchaser interface module configured to transmit, to a prospective purchaser of goods, the electronic commerce web page.

8. The system of claim 7, further comprising program instructions that are executed by at least one processor to, responsive to receiving from the what-you-see-is-what-you-get editing environment an edit of one a plurality of other elements of editable content of the web page, update in both the page content data store and the rendering the one of the other elements of editable content of the web page.

9. The system of claim 7, wherein
the program instructions that are executed by at least one processor to receive from the what-you-see-is-what-you-get editing environment the edit of the element of editable content comprise program instructions that are executed by at least one processor to receive a single editing instruction from the what-you-see-is-what-you-get editing environment, and
the program instructions that are executed by at least one processor to update in both the business transaction data store and the rendering, the element of editable content further comprise program instructions that are executed by at least one processor to update in both the business transaction data store and the rendering, the element of editable content in response to the single editing instruction without subsequent instruction to perform updating in both the business transaction data store and the rendering.

10. The system of claim 7, wherein the program instructions that are executed by at least one processor to render in the what-you-see-is-what-you-get editing environment the web page as the web page would be viewed in the non-editing viewing environment in the browser further comprise program instructions that are executed by at least one processor to simulate an expected rendering by a selected browser application.

11. The system of claim 7, wherein the program instructions that are executed by at least one processor to present the rendering of the web page in the what-you-see-is-what-you-get editing environment further comprise program instructions that are executed by at least one processor to transmit to a browser application the rendering of the web page in the what-you-see-is-what-you-get editing environment as an editing code layer for providing editing functions of the what-you-see-is-what-you-get editing environment, and a web page layer.

12. The system of claim 7, wherein the program instructions are executed to further implement a publishing module configured to deliver web page content resulting from said edit of the element of editable content.

13. The system of claim 12, wherein the publishing module is further configured to deliver the web page content in response to a user request for transmission of the electronic commerce web page or a request to perform a transaction.

14. A non-transitory computer-readable storage medium storing program instructions, wherein the program instructions are executed to implement:

an administrator interface module configured to present a rendering of an electronic commerce web page in a what-you-see-is-what-you-get editing environment, wherein:
the program instructions further comprise program instructions that are executed to implement combination of
business transaction data from a business transaction data store, and
web page presentation data from a page content data store,
the combination comprises:
association of one or more elements of editable content of the web page with data editing tags describing storage locations for one or more elements of the editable content as transaction data in the transaction data store, and
association of one or more other elements of editable content of the web page with one or more other data editing tags describing storage locations for the one or more other elements of the editable content as web page presentation data in the page content data store,
the business transaction data store comprises pricing data presented to a customer of the electronic commerce web page in a course of a business transaction, and
wherein the administrator interface module is further configured to render in the what-you-see-is-what-you-get editing environment the web page as the web page would be viewed by a business transaction customer in a non-editing viewing environment in a browser during a business transaction; and
responsive to receiving from the what-you-see-is-what-you-get editing environment an edit of an element of editable content displayable on the web page during the business transaction, update in both the business transaction data store and the rendering, the element of editable content.

15. The non-transitory computer-readable storage medium of claim 14, further comprising program instructions that are executed to implement, responsive to receipt from the what-you-see-is-what-you-get editing environment an edit of one of a plurality of other elements of editable content of the web page, update in both the page content data store and the rendering, the one of the other elements of editable content of the web page.

16. The non-transitory computer-readable storage medium of claim 14, wherein
the program instructions that are executed to implement receipt from the what-you-see-is-what-you-get editing environment the element of editable content comprise program instructions that are executed to implement receipt of a single editing instruction from the what-you-see-is-what-you-get editing environment, and the program instructions that are executed to implement the update in both the business transaction data store and the rendering, the element of editable content further comprise program instructions that are executed to implement update in both the business transaction data store and the rendering, the element of editable content in response to the single editing instruction without subsequent instruction to perform the update in both the business transaction data store and the rendering.

17. The non-transitory computer-readable storage medium of claim 14, wherein the program instructions that are executed to implement rendering in the what-you-see-is-what-you-get editing environment the web page as the web page would be viewed in the non-editing viewing environment in the browser further comprise program instructions that are executed to implement simulation of an expected rendering by a selected browser application.

18. The non-transitory computer-readable storage medium of claim 14, wherein the presentation of the rendering of the web page in the what-you-see-is-what-you-get editing environment further comprise program instructions that are executed to implement transmit to a browser application the rendering of the web page in the what-you-see-is-what-you-get editing environment as an editing code layer for providing editing functions of the what-you-see-is-what-you-get editing environment, and a web page layer.

19. The non-transitory computer-readable storage medium of claim 14, wherein the program instructions are executed to further implement a publishing module configured to deliver web page content resulting from said edit of the element of editable content.

20. The non-transitory computer-readable storage medium of claim 19, wherein the publishing module is further configured to deliver the web page content in response to a user request for transmission of the electronic commerce web page or a request to perform a transaction.

\* \* \* \* \*